July 11, 1939.　　　　J. R. TAYLOR　　　　2,165,521
ELECTRIC MOTOR CONTROL SYSTEM
Filed Nov. 20, 1937　　　2 Sheets-Sheet 1
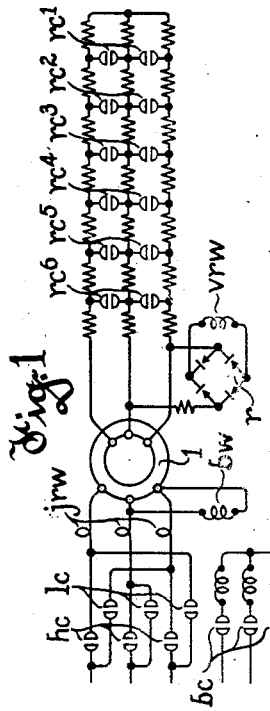
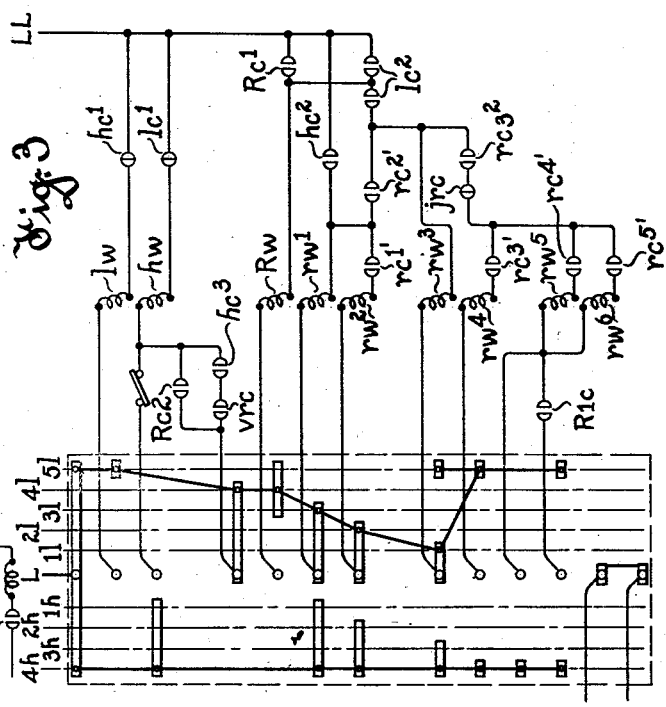
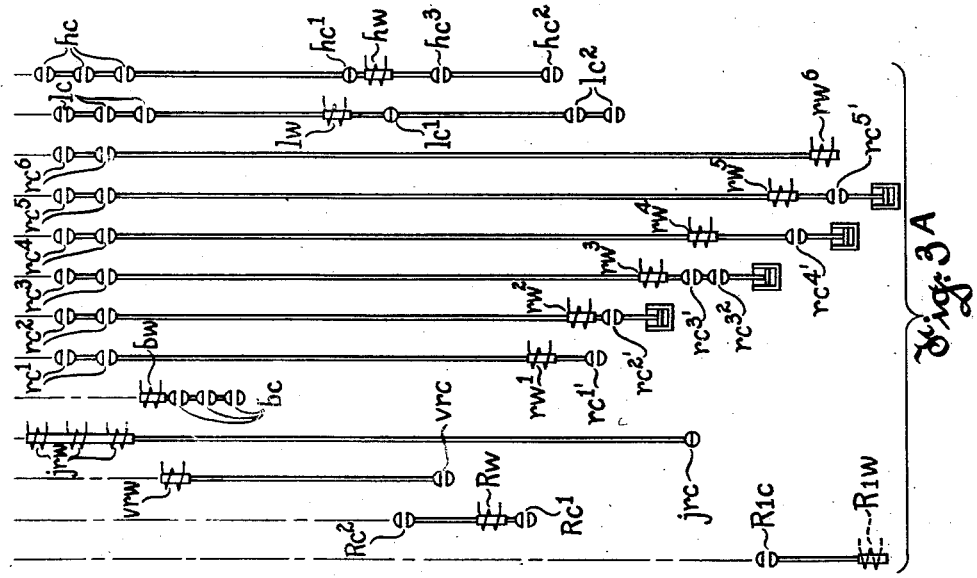
Inventor
John Russell Taylor
By Frank H. Hubbard
Attorney

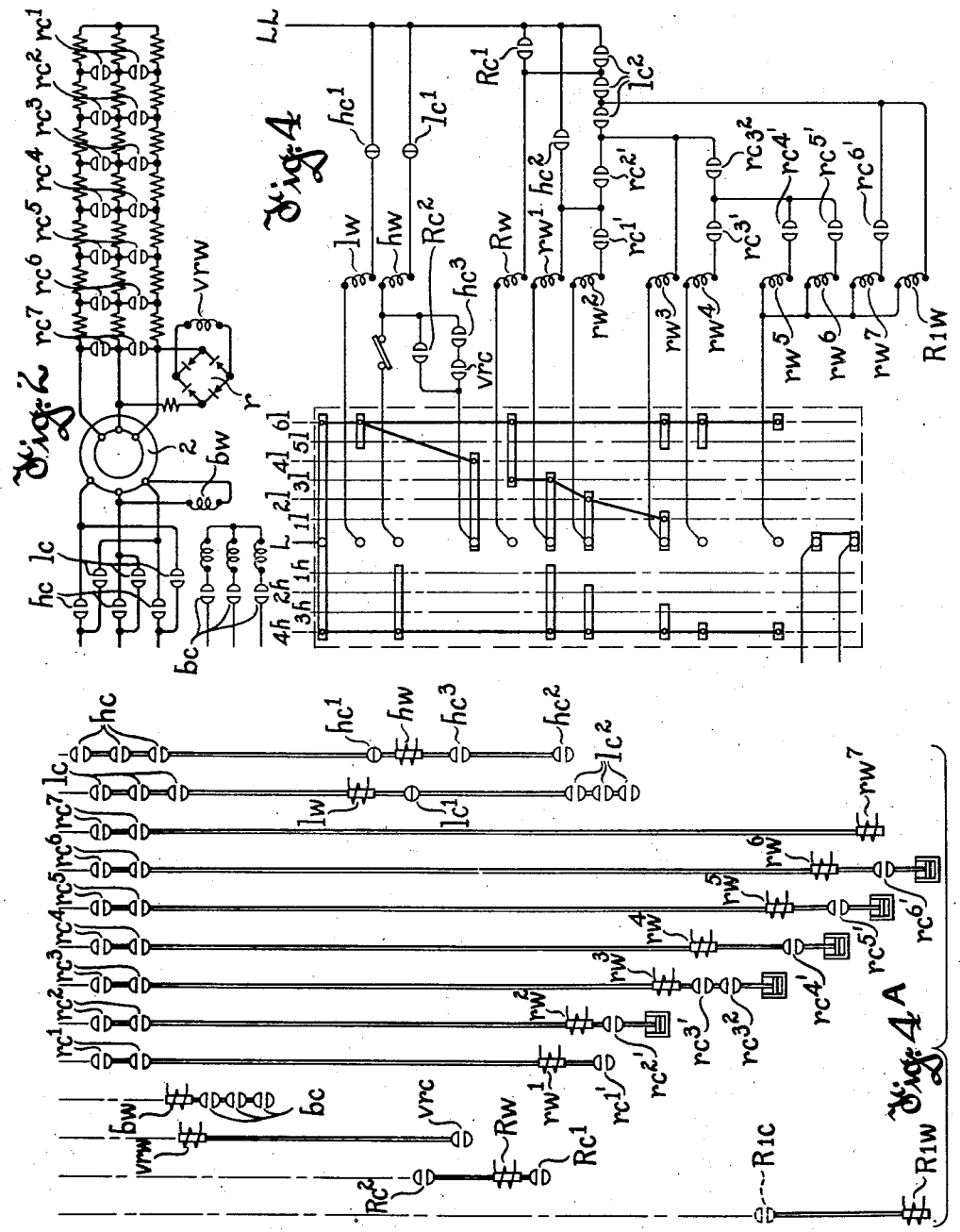

Patented July 11, 1939

2,165,521

UNITED STATES PATENT OFFICE 2,165,521

ELECTRIC MOTOR CONTROL SYSTEM

John Russell Taylor, Bedford, England, assignor to Cutler-Hammer, Inc., Milwaukee, Wis., a corporation of Delaware Application November 20, 1937, Serial No. 175,719
In Great Britain November 23, 1936

5 Claims. (Cl. 172—152)

This invention relates to electric motor control systems and refers more particularly to control systems for the electric motors of lifts or hoists.

The invention relates especially, though not exclusively, to control systems for the electric motors of grab hoists, in which a grab closing line and a grab holding line are employed, operated by respective electric motors. In such systems tensioning of the closing line closes the grab and supports the weight thereof, and tensioning of the holding also supports the weight of the grab. In hoisting and lowering the closed full grab the two lines take about an equal share of the load and both move at the same rate and no particular difficulty is experienced in adjusting the motor speeds accordingly. In lowering the open grab the holding line must take the whole of the load the closing line being quite slack, and, when identical alternating current motors are employed, difficulty is experienced in providing for this since the holding line motor, being under an assisting load, must be running at a speed slightly above synchronism, and the closing line motor, being under a slight retarding load due to friction, must be running at a speed slightly less than synchronism.

One object of the invention is the provision of an improved control system for the electric motors of lifts or hoists in which improved means will be provided for stopping the motor when lowering the lift or hoist.

Another object is the provision of an improved control system for the electric motors of grab hoists of the kind set forth above, in which the above described difficulty will be obviated.

Other objects and advantages of the invention will appear hereinafter.

The invention consists broadly of a lift or hoist system in which the lift or hoist is driven by means of an electric motor, wherein, for stopping said motor when lowering the lift or hoist, the motor is first slowed down by the establishment of electrical braking circuit connections and, at a given point, said braking circuit connections are automatically disestablished and a mechanical brake is applied.

A further feature of the invention, as applied to control systems for the motors of grab hoists of the kind set forth above, consists in the arrangement that the transmission between the motors and their respective lines has a higher speed ratio in the case of the closing line than in the case of the holding line.

In order that the invention may be the more clearly understood, a grab hoist system in accordance therewith, employing a grab closing line and a grab holding line operated by respective motors, will now be described, reference being made to the accompanying drawings wherein:—

Figure 1 is an across-the-line diagram of the closing line motor and its circuits.

Fig. 2 is a similar diagram of the holding line and its circuits.

Fig. 3 is an across-the-line diagram of a drum controller and its associated control circuits for controlling the circuits of the closing line motor.

Fig. 4 is an across-the-line diagram of a drum controller and its associated control circuits for controlling the circuits of the holding line motor.

Fig. 3ª is a representation of the switches embodied in Figures 1 and 3 with their coils and contact members disposed in horizontal alinement with their positions in the straight-line diagrams.

Fig. 4ª is a diagram similar to that shown in Fig. 3ª of the switches embodied in Figs. 2 and 4.

Figure 5 is a diagram of the speed-torque curves for the two lines.

Referring to the drawings the grab, not shown, is controlled by means of a closing line driven by a closing motor 1, Figure 1, and a holding line driven by a holding motor 2, Figure 2. In the usual way, tensioning of the closing line closes the grab and supports the weight thereof, and tensioning of the holding line also supports the weight of the grab. Thus when the two lines share the weight the grab will be closed and when the holding line takes the whole of the weight the grab will be open. In operation therefore, to close the grab and hoist, the closing line is wound in first for closing the grab, and, afterwards, both lines are wound in at the same rate so that they share the load. To stop the grab, both lines are simultaneously stopped. To lower the closed grab both lines are subsequently paid out at the same rate so that they again share the load. To open the grab, the closing line is paid out alone until the grab is open; and for lowering the open grab both lines are subsequently paid out at the same rate, it being important that the closing line shall remain slack; otherwise the grab will close.

It will be seen that, during this last operation of lowering the open grab, the holding line motor will be under negative load, whereas the closing line motor will be under a small positive load due to friction. Both motors are identical alternating current motors, and therefore, during this operation of lowering the open grab, the holding motor must be running at a speed above synchronism (in the absence of any braking) and the closing motor must be running at a speed below synchronism. In the present arrangement to enable the closing line, notwithstanding this fact, to be paid out at least as fast as the holding line, the transmission ratio between the closing line motor and the closing line is made slightly higher (say 7½% higher) than that between the holding line motor and the holding line. It will be appreciated that during the other operations, viz. hoisting a full grab and lowering a full grab, when the motors are both either under positive or under negative load, this difference in speed ratio can be taken care of by adjustment of the circuit resistance of the motors.

The two motors are three phase motors and their operation and their control gear is, to such a large extent, the same, that the same references have been applied to corresponding control parts of the two motors. Thus referring to Figures 1 and 2, each motor has seven resistance sections in each phase, six of the resistance sections being adapted to be cut out, in the case of the closing motor 1, by means of normally open contacts rc1, rc2, rc3, rc4, rc5, rc6: and all seven of the resistance sections being adapted to be cut out in the case of the holding motor 2 by means of normally open contacts rc1, rc2, rc3, rc4, rc5, rc6, rc7. Each motor has normally open hoist contacts hc adapted, upon closure to establish hoist connections and normally open lowering contacts lc adapted, upon closure to establish lowering connections.

Also each motor has associated therewith a voltage relay winding vrw connected through a rectifier r across two of the phases of the secondary and therefore energised in accordance with the speed of the motor, said winding vrw controlling normally open contacts vrc (Figures 3 and 4) so that said contacts open when the speed of the motor reaches about 20% of synchronous speed. The purpose of this voltage relays is, as will hereinafter appear, to establish reverse current braking connections during lowering for the respective motor until the speed is reduced to about 20% of synchronous speed, whereupon said reverse current braking connections are disestablished and a friction brake is applied.

This friction brake in the case of each motor is normally closed and is opened by the energisation of brake windings connected through contacts bc (Figures 1 and 2) across the lines, said contacts bc being closed by energisation of a winding bw which, as shown, is energised when either the hoisting contacts hc or the lowering contacts lc are closed.

The circuits of the closing line motor 1 are controlled by means of a drum controller shown in Figure 3, and those of the holding line motor are controlled by means of a drum controller shown in Figure 4. These drum controllers are represented in the usual conventional way each drum carrying a number of drum contacts and having associated cooperating stationary contacts shown in a vertical line, the drum contacts being all connected to one supply line L and the various control circuits being established through the cooperating stationary contacts to another supply line LL. Both drums have four hoisting notches represented by the chain dotted lines 1h to 4h. The closing line drum has five lowering notches represented by the five chain dotted lines 1l to 5l, whereas the holding line drum has six lowering notches represented by the six chain dotted lines 1l to 6l. The remaining circuits, windings and contacts are shown in the conventional manner and will not be otherwise described than in the following description of the operation of the system.

In operation, referring to Figures 1, 2, 3 and 4, when either drum controller is operated to the first hoisting notch 1h, the winding hw controlling the hoist contacts hc will be energised through a normally closed interlock lc1 on the lowering contacts lc. Contacts hc accordingly close to establish hoisting connections for the motor. Immediately said contacts hc close, a normally open interlock hc2 on said contacts closes, and thereupon the winding rw1 is energised thereby closing contacts rc1 and short circuiting the end resistance sections.

On moving to the next hoisting notch 2h the winding rw2 is energised through a normally open interlock rc1' on the contacts rc1, and the said interlock hc2. The contacts rc2 controlled by said winding rw2 accordingly close thereby short circuiting the next resistance sections.

On moving to the third hoisting notch 3h, the winding rw3 controlling contacts rc3 is energised through a normally open interlock rc2' on the contacts rc2, and said interlock hc2. The contacts rc3 accordingly close thereby short circuiting the next resistance section. The interlock rc2' however closes only after a time interval and therefore there must be an interval between the closing of contacts rc2 and contacts rc3.

On moving to the final hoisting notch 4h, the winding rw4 controlling the contacts rc4 is energised through a normally open interlock rc3' on the contacts rc3, a second normally open interlock $rc3^2$ on said contacts rc3, and said interlocks rc2' and hc2. Contacts rc4 accordingly close to cut out fresh resistance, and as before the interlock rc3' closes slowly to delay this operation.

After a time interval an interlock rc4' on contacts rc4 closes and winding rw5 is energised as will be clearly seen, thereby closing contacts rc5 and cutting out further resistance, and after a further interval an interlock rc5' on contacts rc5 closes, and winding rw6 is energised closing contacts rc6 and cutting out further resistance.

It will be seen that the contacts rc7 (Figure 4) of the holding line motor are never closed during hoisting, since the corresponding winding rw7 has, in its circuit, a normally open interlock lc2 on the contacts lc.

It will also be seen that, in the case of the closing line motor 1 only, the energising circuits of the windings rw4, rw5 and rw6 (Figure 3) are established through normally closed contacts jrc of a jamming relay having windings jrw in the primary circuits of the motor. This is in order that if the closing line motor 1 should take an undue proportion of the load during hoisting, owing to the operator being late in starting the holding line motor, said closing line motor will be overloaded and the contact jrc will temporarily open causing the contacts rc4, rc5 and rc6 to fall out and slowing down the closing line motor, thereby enabling the holding line motor to catch up and take its due proportion of the load.

In lowering, either drum must be operated at least as far as the fifth lowering notch 5l before anything happens. Upon operating either drum to the fifth lowering notch 5l, a circuit is established for the winding lw controlling the lowering contacts lc, said circuit being established through a normally closed interlock hc1 on the hoisting contacts hc. Said lowering contacts lc thereupon close and the motor is driven in a direction for lowering the lines.

Immediately upon closure of said lowering contacts lc, a normally open interlock lc2 closes and the winding Rw is energised of a relay having normally open contacts Rc1 and Rc2. Contacts Rc1, upon closing establish a maintaining circuit for the winding Rw independently of the interlock lc2. Contacts Rc2 upon closing effect nothing at the moment.

Also, at the fifth notch 5*l* winding *rw*3 is energised through interlock *lc*2, thereby closing contacts *rc*3 and short circuiting the three end resistance sections, and when, after a time interval, interlock *rc*3' and interlock *rc*3² on contacts *rc*3 are both closed, winding *rw*4 is energised thereby closing contacts *rc*4 and short circuiting a further resistance section. It will be noted, however, that, while the holding line drum of Figure 4 is at the fifth notch 5*l* no further resistance sections can be short circuited from the holding line motor, and, in consequence, no further resistance sections can be short circuited from the closing line motor either, since the winding R*lw* of Figure 4 remains deenergised of a relay having contacts R*lc* of Figure 3 in circuit with the windings *rw*5 and *rw*6.

When, however, the holding line drum of Figure 4 is moved to the sixth notch 6*l*, winding *rw*5 of Figure 4 will be energised through interlock *rc*4' on contacts *rc*4, thereby closing contacts *rc*5 and short circuiting another resistance section, and, after another interval, contacts *rw*6 of Figure 4 will be energised through interlock *rc*5' on contacts *rc*5, thereby closing contacts *rc*6 and short circuiting another resistance section, and, finally, after another interval, winding *rw*7 of Figure 4 will be energised through interlock *rc*6' on contact *rc*6 and through interlock *lc*2, thereby closing contacts *rc*7 and short circuiting the last resistance section.

Also the winding R*lw* of Figure 4 will now be energised through interlock *lc*2, and contacts R*lc* of Figure 3 will accordingly be closed; therefore, if the closing line drum of Figure 3 is still at the fifth notch 5*l*, winding *rw*5 of Figure 3 will be energised after an interval through interlock *rc*4', on contacts *rc*4, thereby closing contacts *rc*5 and short circuiting another resistance section and, after another interval, winding *rw*6 will be energised through interlock *rc*5' on contacts *rc*5, thereby closing contacts *rc*6 and short circuiting another resistance section.

If either drum is now moved back to the fourth notch 4*l*, winding *lw* is deenergised and contacts *lc* accordingly open; and, contacts R*c*2 being now closed as heretofore described, winding *hw* is energised through said contacts R*c*2 and interlock *lc*1 on contacts *lc*. Hoisting contacts *hc* accordingly close and hoisting connections (that is to say reverse current braking connections) are established. At the same time interlock *lc*2 opens, deenergising all the resistance-controlling windings after *rw*4, so that all the resistance is restored to both circuits.

If either drum is now moved back to the third notch 3*l*, winding *rw*1 is energised through interlock *hc*2 on contacts *hc*, whereupon contacts *rc*1 close, thereby short circuiting the end resistance, and increasing the reverse current braking.

If either drum is now moved back to the second notch 2*l*, winding *rw*2 is energised through interlock *rc*1' on contacts *rc*1 and interlock *hc*2 on contacts *hc*. Contacts *rc*2 accordingly close thereby short circuiting another resistance section and again increasing the reverse current braking. At the same time winding R*w* is deenergised, thereby opening its maintaining contact R*c*1 and also the contact R*c*2. This however does not necessarily immediately effect deenergisation of winding *hw*, since the contact R*c*2 is shunted by two contacts in series, viz. a normally open interlock *hc*3 (now closed) on the contacts *hc* and the contacts *vrc* of the voltage relay winding *vrw*. As before stated these contacts *vrc* only open when the speed of the motor has fallen to about 20% of synchronous speed, and therefore, assuming the motor speed is still above this speed, the winding *hw* will remain energised and the contacts *hc* closed.

If either drum is now moved back to the first notch 1*l*, or to neutral, winding *rw*3 is energised, if a time interval has elapsed, through interlock *rc*2' on contacts *rc*2, and through said interlocks *hc*2. Contacts *rc*3 accordingly close and a further resistance section is short circuited thereby further increasing the reverse braking effect.

At any time on the second or first notch 2*l* or 1*l* or at neutral position, when the speed of either motor falls to 20% of synchronous speed, contacts *vrc* will open, thereby deenergising winding *hw* and opening contacts *hc*. This will stop reverse current braking and, by deenergising winding *bw* of contacts *bc*, deenergise the brake windings and apply the brake. At the same time, interlock *hc*2 opens thereby deenergising windings *rw*1, *rw*2, *rw*3 and throwing all resistance sections back into circuit. The connections are all now at normal.

The practical function of the system will now be described reference being made to Figure 5. This figure shows the speed-torque curves for the two lines, the torque being represented by the abscissae and the speed by the ordinates. The curves for the holding motor are shown in full lines and those for the closing motor in dotted lines. The points A and B represent the synchronous line speeds for the closing and holding motors respectively in the hoisting direction, and the points X and Y represent the synchronous line speeds of said closing and holding motors respectively in the lowering direction, the space between the points A and B and between the points X and Y being accounted for by the difference between the speed transmission of the two motors as hereinbefore described.

The group of curves *o*, *rc*1 to *rc*6 directed towards the points A and B are the curves which apply when hoisting connections are established and the resistance contacts closed are respectively from none to *rc*6, it being remembered that the contact *rc*7 (Figure 4) is never closed when hoisting connections are established.

The group of curves *rc*4 to *rc*7 passing through the points X and Y are the curves which apply when lowering connections are established and the resistance contacts closed are respectively from *rc*4 to *rc*7, it being remembered that the contacts *rc*1 and *rc*2 are never closed when lowering connections are established. In practice contacts *rc*3 are seldom closed alone.

The point C represents 100% torque for each motor. The point D represents the torque on the holding motor when lowering the open grab and the point E represents the torque on the closing motor when lowering the open grab, and it will be seen that this torque is in an upward direction being caused by friction in the transmission etc.

To close the grab and hoist, the closing line drum is moved to the notch 4*h* and when the grab is nearly closed the holding line drum is also moved to the notch 4*h*. As before stated, if this movement of the closing line drum is a little late, the jamming relay contacts *jrc* will operate to delay the speeding up of the closing line motor so that the two motors will take up their load together. Referring to point C, it will be that, when contacts rc2 are closed the motors are only just capable of supporting the load. Hoisting does not begin until contacts rc3 close. The horizontal lines H1, H2, H3 represent the changes to contacts rc4, rc5, rc6, and it will be seen that throughout the hoisting operation the speed and torque of the two motors will remain fairly equal until finally a full speed is attained represented by point F at which the closing line takes slightly the greater torque.

To stop the hoisting grab, both drums are moved to the off position whereupon the motors will be deenergised and the friction brakes applied.

Subsequently, to open the grab, the closing line drum is moved to notch 5l, and when the grab is open the drum is moved to off, thereby stopping closing line motor almost instantly, as there is substantially no load by reverse current braking followed by the friction brake as heretofore described.

To lower the open grab, the closing line drum is moved to the notch 5l and the holding line drum to the notch 6l. At these positions the contacts rc6 of the closing line motor and the contacts rc7 of the holding line motor are closed, so that the curves on Figure 5 which apply are the dotted curve rc6 and the full curve rc7. The holding line motor being subjected to torque D and the closing line motor to torque E, it will be seen that the speeds of the two lines will be substantially the same and represented by the point F1.

To lower the full grab both drums are moved to the notch 5l. In this position contacts rc4 close in the case of both motors and the dotted and full curves rc4 are the curves which apply. As will be seen, these curves lie fairly close together, and, assuming that the full-grab torque in a lowering direction taken by each motor is somewhere close to that represented by the point D, being less than the torque C owing to reversal of friction, a speed G will be attained at which both motors take roughly the same torque, the holding motor actually taking slightly the more.

For stopping the full grab in the downward direction, both drums are normally moved to the off position, so that contacts rc3 rapidly close with the hoisting connections established. In this position the dotted and full curves rc3 apply and it will be seen that the connections are such as to be capable of lifting the grab at about ½ speed. The downward speed, therefore, rapidly falls to about 20% of synchronous speed whereupon the line connections are interrupted and the friction brake applied as heretofore described. The two lines rc3, and also the preceding lines o, rc1, rc2, be fairly close together so, once again, during reverse current braking the load is fairly evenly shared.

It will be seen that, during most of the operations, the two drums are simultaneously at the same notch. In practice the drums are located close to one another with their operating handles towards one another so that, when the drums are being moved together over the same notches, such as when hoisting, lowering and stopping the full grab, both handles can be moved by one hand.

What I claim and desire to secure by Letters Patent is:

1. A system of control for grab bucket hoists having a holding line and a closing line, comprising two identical alternating current motors each for operating one of said lines, and means rendering said motors operable to effect paying out of said lines at substantially the same speed when the motor associated with said holding line is under negative load and the motor associated with said closing line is under positive load, said means including drives of different speed ratios between said motors and their associated lines, the drive associated with said closing line being of higher speed ratio than the drive associated with said holding line.

2. A system of control for grab bucket hoists having a holding line and a closing line, comprising two identical alternating current motors each for operating one of said lines, a drive between each of said motors and its associated line, the drive associated with said closing line being of higher speed ratio than the drive associated with said holding line, and means for controlling the speed of said motors to provide for paying out of said lines at substantially the same speed with the holding line tensioned and the closing line slack for maintenance of the bucket in open position.

3. A system of control for grab bucket hoists having a holding line and a closing line, comprising two identical alternating current motors each for operating one of said lines, a drive between each of said motors and its associated line, the drive for said closing line being of higher speed ratio than the drive for said holding line, and means for controlling said motors to provide for paying out of said lines at substantially the same speed when substantially the entire weight of the bucket is supported by the holding line and also when the weight of the bucket is shared by the holding and closing lines.

4. A system of control for grab bucket hoists having a holding line and a closing line, comprising two identical alternating current motors each for operating one of said lines, a drive between each of said motors and its associated line, the drive associated with said closing line motor being of higher speed ratio than the drive associated with said holding line motor, a controller for each of said motors including a master switch, said motors being controllable by said master switches to provide for paying out of the holding and closing lines at substantially the same speed when the weight of the bucket is shared by the holding and closing lines and also when substantially the entire weight of the bucket is supported by the holding line.

5. A control system for hoists and the like having an overhauling descending load, comprising an alternating current motor for driving the hoist, a brake for said motor which is normally set and is released upon energization of said motor, means for establishing reverse power connections for said motor, comprising a hoisting contactor and a lowering contactor, a master switch for controlling said contactors, having an off position, a running position and a plugging position between said off and running positions, means for closing said lowering contactor upon movement of said master switch from off position to running position and for opening said lowering contactor and closing said hoisting contactor upon movement of said master switch from running position to plugging position and means responsive upon a given reduction in the speed of said motor to effect opening of said hoisting contactor for stopping of said motor under the action of said brake.

JOHN RUSSELL TAYLOR.

CERTIFICATE OF CORRECTION.

Patent No. 2,165,521.                              July 11, 1939.
            JOHN RUSSELL TAYLOR.

It is hereby certified that error appears in the above numbered patent requiring correction as follows: In the heading to the drawings, Sheets 1 and 2, line 3, for "2 Sheets" read 3 Sheets; and insert the sheet of drawing shown below as Sheet 3 of the drawings in the patent -

July 11, 1939.        J. R. TAYLOR            2,165,521

ELECTRIC MOTOR CONTROL SYSTEM

Filed Nov. 20, 1937          3 Sheets-Sheet 3

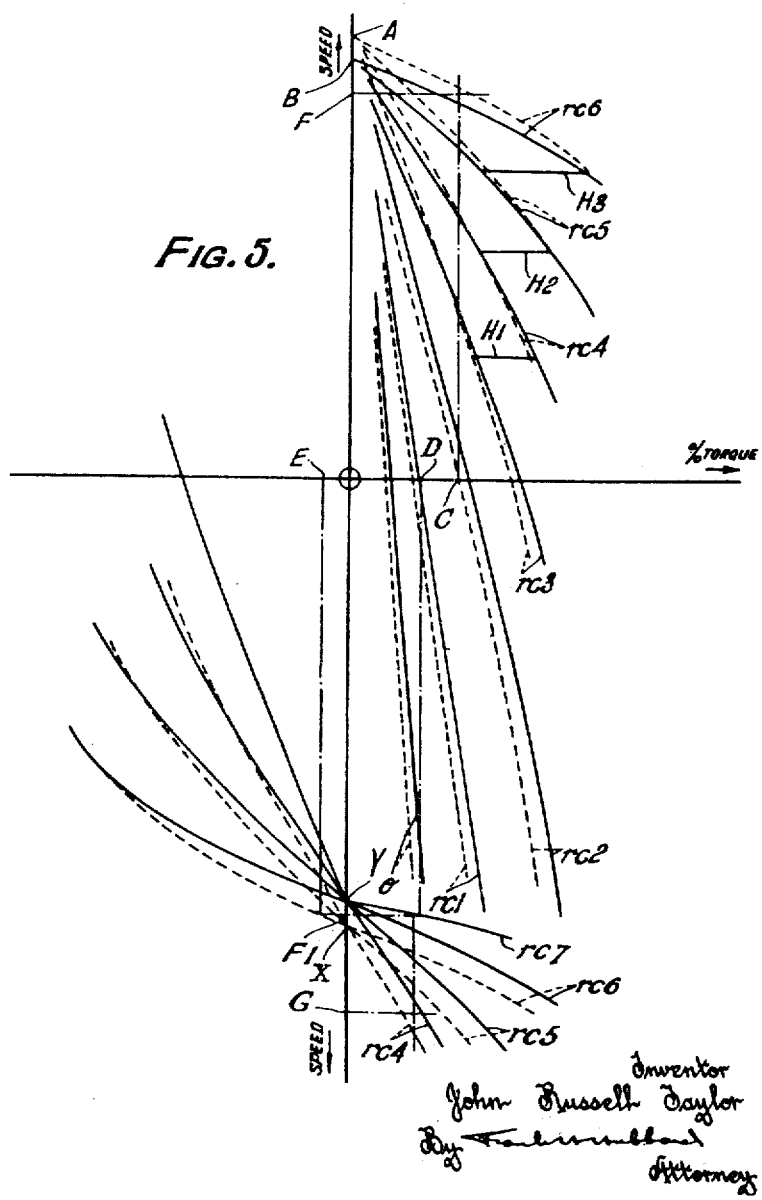

FIG. 5.

and that the said Letters Patent should be read with this correction therein that the same may conform to the record of the case in the Patent Office.
Signed and sealed this 17th day of October, A. D. 1939.

(Seal)

Henry Van Arsdale,
Acting Commissioner of Patents.